United States Patent
Stefina

(10) Patent No.: US 7,891,372 B2
(45) Date of Patent: Feb. 22, 2011

(54) CONTAMINATION AND FLOW CONTROL

(75) Inventor: Brian K. Stefina, Waterford, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 802 days.

(21) Appl. No.: 11/795,166

(22) PCT Filed: Apr. 13, 2007

(86) PCT No.: PCT/US2007/009155
§ 371 (c)(1), (2), (4) Date: Jul. 12, 2007

(87) PCT Pub. No.: WO2007/120836
PCT Pub. Date: Oct. 25, 2007

(65) Prior Publication Data
US 2009/0294722 A1 Dec. 3, 2009

Related U.S. Application Data

(60) Provisional application No. 60/791,854, filed on Apr. 13, 2006.

(51) Int. Cl.
*F16K 41/00* (2006.01)
(52) U.S. Cl. .......................... 137/242; 251/214; 251/325
(58) Field of Classification Search ................. 251/325, 251/214; 137/242
See application file for complete search history.

(56) References Cited

U.S. PATENT DOCUMENTS

| | | | | |
|---|---|---|---|---|
| 3,470,899 | A | | 10/1969 | Cusi |
| 3,958,592 | A | * | 5/1976 | Wells et al. ............... 137/315.3 |
| 4,290,610 | A | * | 9/1981 | Lizogub et al. ............. 277/417 |
| 4,408,627 | A | * | 10/1983 | Harris ......................... 137/242 |
| 4,773,440 | A | * | 9/1988 | Yanagawa et al. ........... 137/242 |
| 5,078,175 | A | * | 1/1992 | Martin et al. ................ 137/242 |
| 5,156,184 | A | * | 10/1992 | Kolchinsky ............... 137/454.5 |
| 5,511,531 | A | * | 4/1996 | Cook et al. ............. 123/568.21 |
| 5,918,635 | A | * | 7/1999 | Wang et al. ............. 137/625.65 |
| 5,979,483 | A | | 11/1999 | Zapalac |
| 6,247,461 | B1 | * | 6/2001 | Smith et al. ............... 123/568.2 |
| 6,330,880 | B1 | * | 12/2001 | Okada et al. .............. 123/568.2 |
| 6,453,934 | B1 | * | 9/2002 | Bircann et al. ............... 137/242 |
| 6,481,424 | B2 | * | 11/2002 | Bircann et al. ......... 123/568.11 |
| 6,655,657 | B2 | * | 12/2003 | Bircann ....................... 251/214 |
| 6,874,754 | B2 | * | 4/2005 | Geib et al. ................... 251/214 |
| 6,918,409 | B1 | * | 7/2005 | Parker ................... 137/614.11 |
| 7,013,880 | B2 | * | 3/2006 | Watanuki et al. ......... 123/568.2 |

(Continued)

*Primary Examiner*—John Bastianelli
(74) *Attorney, Agent, or Firm*—Warn Partners, P.C.

(57) ABSTRACT

The present invention is directed toward an anti-contamination arrangement for a valve having a valve housing, a bushing positioned in the valve housing, a valve member including a valve shaft and a valving portion operable for engaging a valve seat, slidably disposed through the bushing, and a supply port operably associated with the valve member. The valve also includes a control chamber controlled by the valving portion, and a valve seat positioned between the supply port and the control chamber. The valve member is operably associated with the valve seat for controlling the flow of fluid from the supply port to the control chamber upon the movement of the valve member in relation to the valve seat. There is also an anti-contamination arrangement positioned between the bushing and the valve shaft for collecting and removing contamination from the valve member.

16 Claims, 4 Drawing Sheets

U.S. PATENT DOCUMENTS

2004/0051067 A1 3/2004 Fujita et al.
2004/0065860 A1 4/2004 Bircann
2005/0274920 A1* 12/2005 Busato et al. .......... 251/129.11

* cited by examiner

CONTAMINATION AND FLOW CONTROL

CROSS-REFERENCE TO RELATED APPLICATIONS

This application claims the benefit of U.S. Provisional Application No. 60/791,854, filed Apr. 13, 2006. The disclosure of which is herein incorporated by reference.

FIELD OF THE INVENTION

The present invention relates to valves and removing the contamination of valves. Particularly, the present invention relates to the removal and prevent buildup of contamination in an annulus between a valve shaft moving through a land.

BACKGROUND OF THE INVENTION

Valves for controlling the flow of various forms of fluid are generally known. In the areas of fluid dynamics and hydraulics, valves are often used to control the flow of high pressure fluid. Often these types of valves experience contamination in the form of particles or other substances that must be controlled or removed in order to ensure that the valve continues to function properly. It is therefore desirable to develop valves that have contamination control features that will prevent buildup contamination levels and prevent valve failure.

SUMMARY OF THE INVENTION

The present invention is directed to a valve having a land separating a high pressure area and a low pressure area., A valve member with a valving portion and a valve shaft is slidably disposed through said land with a supply portion being operably associated with the valve member. A contamination control arrangement is positioned in the annulus between the land and the valve shaft to prevent buildup of contamination in the aniiulus by moving the contamination past the land to the low pressure area.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
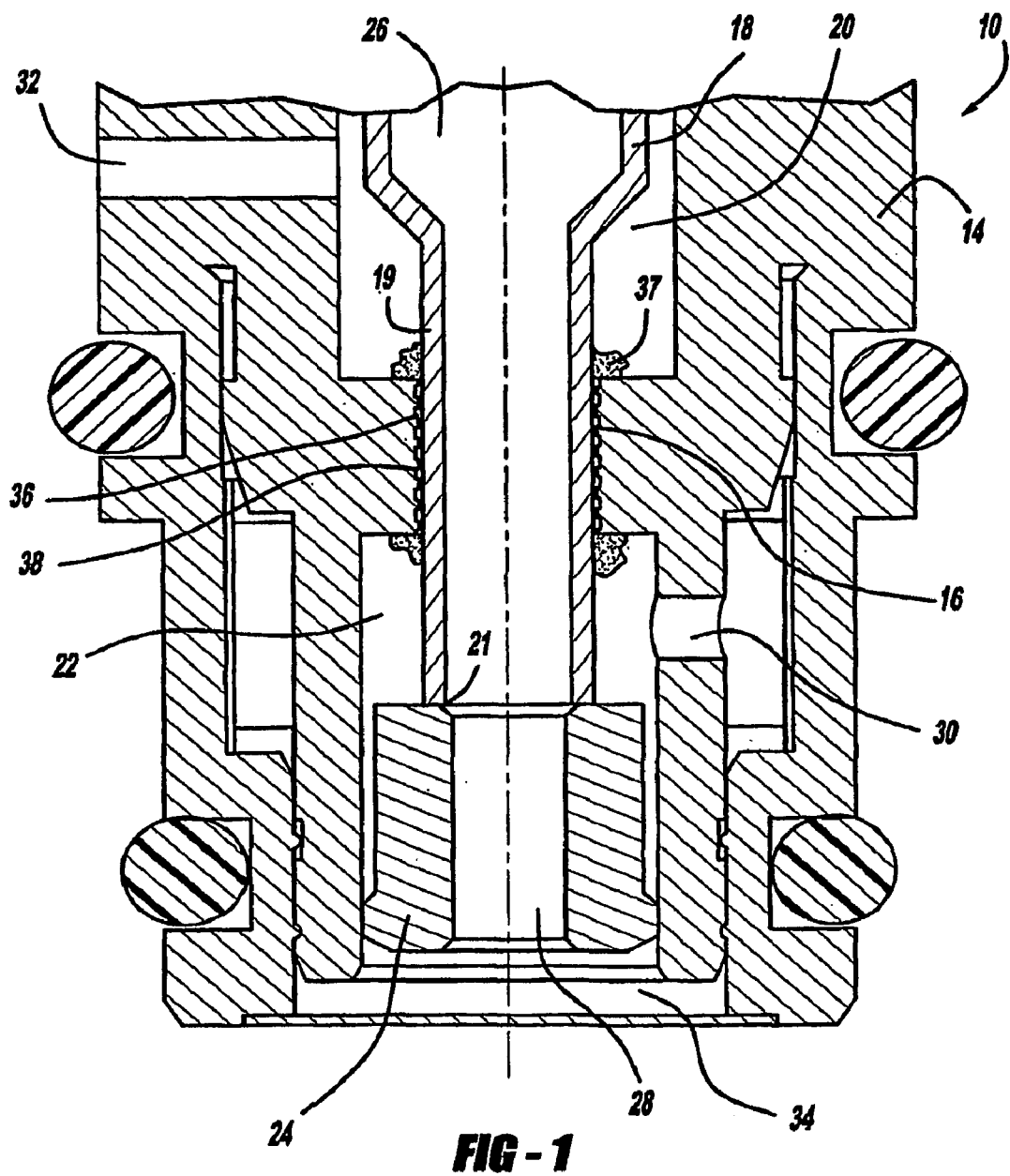
FIG. 1 is a cross-sectional plan side view of a valve having an contamination control arrangement with the valve in a closed position, according to the present invention.

Referring to FIG. 1, an example of the present invention used in a valve is shown at 10. The valve 10 in this embodiment is a solenoid valve, but can be in the form of another type of valve as well. The valve 10 of the present invention can be used in any type of application where contamination control is desirable in the vicinity of a land that separates a high pressure and low pressure area. In particular the vale 10 can be used in any type of hydraulic or fluid application. Additionally, the present invention can be incorporated in an application where it is desirable to have uniform fluid pressure center the valve during operation. The valve 10 has a valve housing 14, and a land 16 affixed inside the valve housing 14. The land 16 has a valve member 18, including a valve shaft 19 and a valving portion 21, slidably disposed through a portion of the land 16. The land can be a bearing, bushing, insert or any similar type of structure. The valve member 18 extends from a first chamber 20 through the land 16, into a second chamber 22. The first chamber 20 is a low pressure area and the second chamber 22 is a high pressure area.

The valving portion 21 rests against a valve seat 24 which is affixed to the housing 14. The valve member 18 has a hollow portion 26 which extends at least partially through the valve member 18 and aligns with a hollow section 28 of the valve seat 24. The valve member 18 is connected to an actuator (not shown) of the valve 10 which controls the movement of the valve member 18 through the land 16.

The housing 14 also has an exhaust port 32 which connects the first chamber 20 to atmosphere or a sump, and supply port 30 which feeds pressurized fluid into the second chamber 22. The supply port 30 receives pressurized fluid from a source, such as a pump (not shown) located outside of the housing.

The hollow section 28 of the valve seat 24 is in fluid connection with a control chamber 34. The control chamber 34 is operably connected for hydraulic control of a device. The device can be any type of hydraulically actuated device such as, but not limited to, a transmission valve, agricultural valve, medical valve or hydraulic control valve, a transmission, clutch, differential, turbo shift mechanism, transfer case, brake system, power steering system, or an all-wheel drive coupling.

The land 16 also features a contamination control arrangement 36 which in this embodiment is a helical groove 38. The helical groove 38 extends along substantially the entire length of the interior diameter of the land 16, and operably guides the valve shaft 19. The contamination control arrangement 36 of the present invention is not limited to the helical groove 38, the contamination control arrangement 36 may also be a knurled surface, a double helical surface, an etched surface, textured surface, one or more grooves, or other surface capable of removing the contamination shown at 37, from the annulus between the land 16 and the valve shaft 19, and transferring the contamination 37 from the second chamber 22 to the first chamber 20 along the valve shaft 19. Additionally the contamination control arrangement 36 can vary in shape, depth and pitch depending on the needs of a particular application and the type of contaminate or debris that the contamination control arrangement will be encountering.

The contamination control arrangement 36 is not necessarily limited to being part of the housing 14. The contamination control arrangement 36 can also be formed on the valve shaft 19 and function in the same manner as when the contamination control arrangement 36 is formed on the housing 14.

Figure 2:
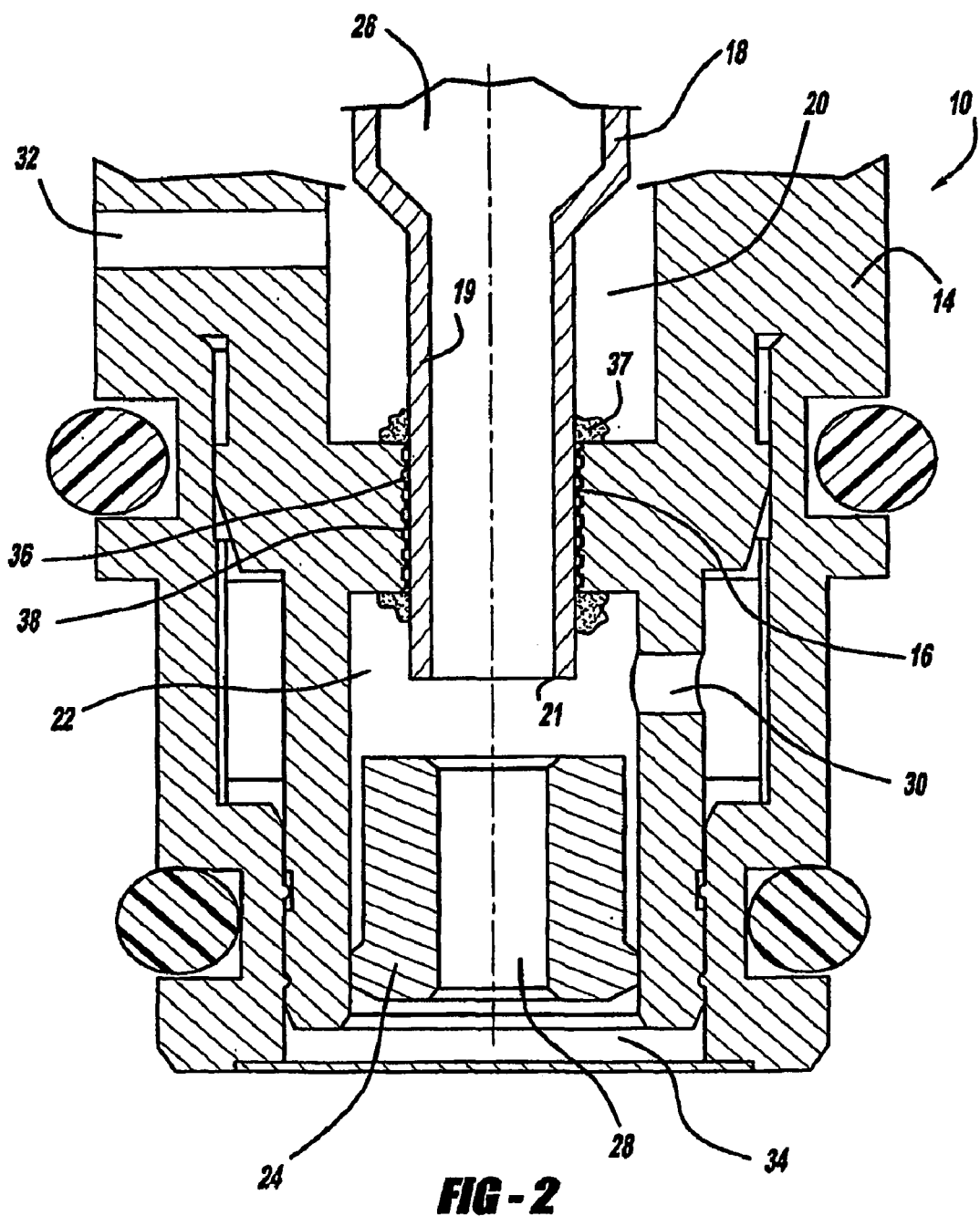
FIG. 2 is a sectional side view of a valve having an contamination control arrangement with the valve in an open position, according to the present invention.
Figure 3:
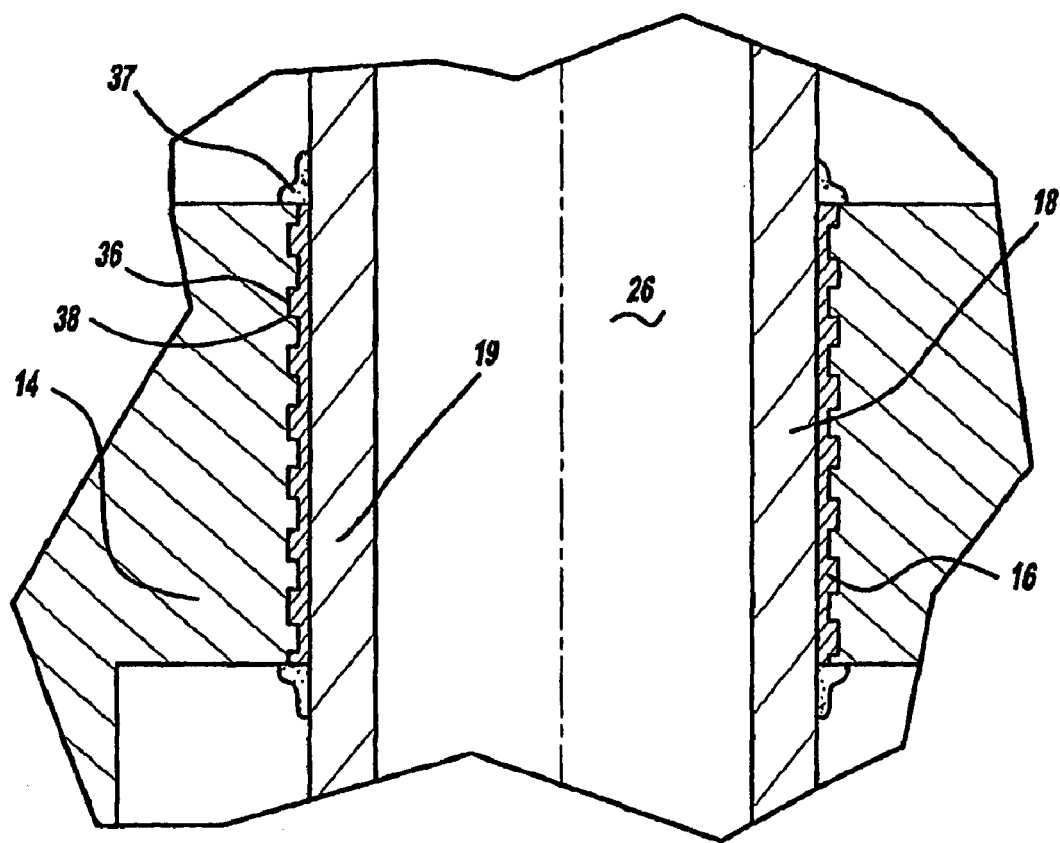
FIG. 3 is an enlarged sectional side view of a valve having an contamination control arrangement, according to the present invention.

In operation, the supply port 30 feeds fluid into the second chamber 22. When the valving portion 21 is in the closed position shown in FIG. 1, the fluid will not be allowed to enter the hollow section 28 of the valve seat 24 and into the control chamber 34. When the actuator is actuated, and the valve portion 21 is in the open position shown in FIG. 2, fluid flowing from the supply port 30 will enter the second chamber 22 and into the hollow section 28 of the valve seat 24. The fluid will then flow into the control chamber 34 and actuate the particular device the valve 10 is attached to. Once the control chamber 34 is under pressure, some of the fluid will flow into the hollow portion 26 of the valve member 18. When the actuator is no longer actuated, the valving portion 21 will return to the position shown in FIG. 1; the actuator contains a spring or other device to maintain the valving portion 21 in the position shown in FIG. 1 as a default position.

The movement of the valve member 18 can be affected by contamination 37 when being moved from the open position to the closed position. In the present invention, to prevent contamination 37 build-up, the land 16 is equipped with the contamination control arrangement 36, which in this embodiment is in the form of a helical groove 38. The helical groove 38 facilitates moving the contamination 37 on the valve shaft 19 from the second chamber 22 to the first chamber 20 as the valve shaft 19 slides through the land 16. A small amount of pressurized fluid from the second chamber 22 flows through the helical groove 38 to the low pressure first chamber 20 which facilitates to remove the contamination 37 from the second chamber 22 in order to keep the valve member 10 functioning properly.

An additional benefit of the pressurized fluid flowing through the helical groove is that the small amount of pressurized fluid acts on the full circumference of the valve member 18 to keep the valve member 18 centered in the land 16, while allowing contamination 37 to pass through the helical groove 38. This also reduces the effect of hysteresis during valve operation. Any excess pressurized fluid and contamination 37 will reach the first chamber 20 after flowing through the helical groove 38, and can flow out of the exhaust port 32 into the atmosphere/sump. The contamination control arrangement 36 controls the amount of contamination build-up in the annulus between the valve shaft 19 and land 16.

In addition to controlling contamination 37, the contamination control arrangement 36 provides centering of the valve shaft 19 in the land 16. Pressure from the fluid being in the second chamber 22 will force a small amount of fluid through the helical groove 38. The full circumferential arrangement of pressurized fluid keeps the valve member 18 centered in the land 16, in addition to allowing the contamination 37 to pass through the helical groove 38.

Figure 4:
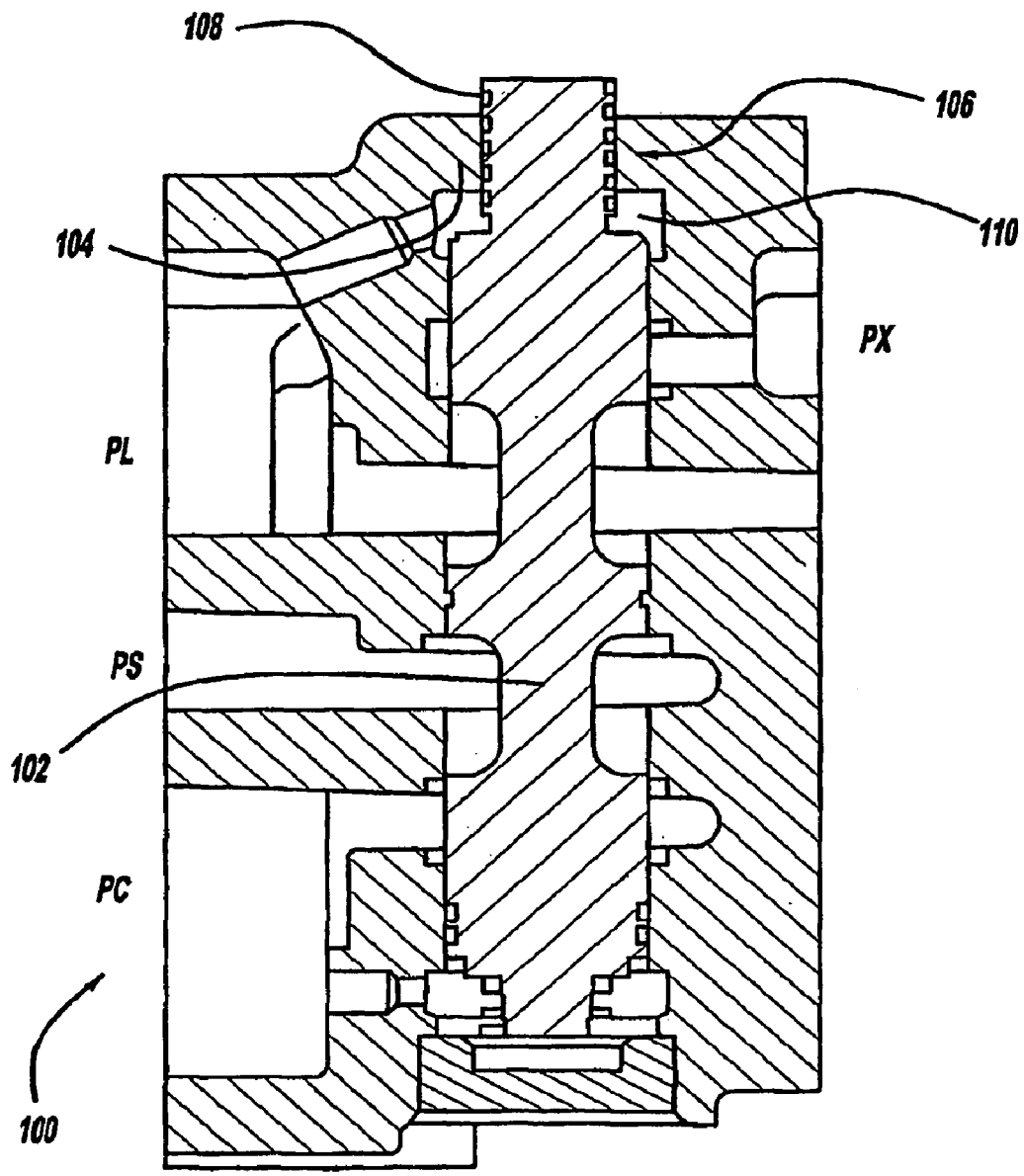
FIG. 4 is a cross-sectional view of an alternate embodiment of the invention wherein the contamination control arrangement incorporated in a spool valve.

The contamination control arrangement 36 can be incorporated on any type of hydraulic valve and is particularly useful in applications where a sliding portion of the valve member slides through a land or other portion where a high pressure area is separated by a low pressure area. Thus the contamination control arrangement will serve two functions in that it will control and remove the build up of contaminate in the region between the high pressure area and low pressure area in addition to providing hydraulic centering of the moveable components of the valve member as discussed above. FIG. 4 depicts an alternate embodiment of the invention on a valve 100. The valve 100 has a movable spool 102 that has a land 104 separating a low pressure area 108 and high pressure area 110. The spool 102 has one or more valving portions that allow it to function in multiple ways. Between the low pressure 108 and high pressure area 110 there is a contamination control arrangement 106. In this particular alternate embodiment of the invention the contamination control arrangement 106 is a helical groove on the spool 102. However, just like all of the other embodiments of the invention the contamination control arrangement can also be located on the land or on both the land 104 and spool 102.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A valve comprising:
   a land separating a high pressure area and low pressure area;
   a valve member, including a valving portion, wherein a portion of said valve member is slidably disposed through said land;
   a supply port operably associated with said valve member; and
   a contamination control arrangement positioned between said land and said valve member for preventing buildup of contamination in said high pressure area and transferring said contamination to said low pressure area.

2. The valve of claim 1, wherein said contamination control arrangement is one selected from a group comprising a helical groove, a knurled portion, a double helical surface, an etched surface, textured surface, one or more grooves, all formed on said valve shaft or said land or combination thereof.

3. The valve of claim 1 wherein said contamination control arrangement further provides hydraulic centering of said valve member during operation so that said valve member is centered in said land causing said valve portion to be centered.

4. The valve of claim 1 wherein pressurized fluid from said high pressure area migrates through said contamination control arrangement so that any contaminate present on said valve member on in an annulus between said portion of said valve member and said land is removed to said low pressure area.

5. The valve of claim 1 wherein said valve member is a spool having one or more valve portions.

6. The valve of claim 1 wherein said valve is one selected from the group comprising a transmission valve, agricultural valve, medical valve or hydraulic control valve, a transmission, clutch, differential, turbo shift mechanism, transfer case, brake system, power steering system, or an all-wheel drive coupling.

7. A valve comprising:
   a valve housing including a valve seat;
   a land disposed in said valve housing;
   a first chamber and a second chamber formed by said valve housing and said land;
   a supply port connected to said second chamber;
   a valve member including a valve shaft slidably disposed through said land, extending from said first chamber through said land and into said second chamber, and a valving portion;
   a control chamber controlled by said valve member;
   a contamination control arrangement operably associated with said land and circumferentially disposed about said valve shaft for the buildup of contaminant between said land and said valve shaft, wherein said contamination control arrangement removes debris from an annulus between said valve shaft and said land as said valve shaft slides through said land, and subsequent movements of said valve shaft through said land causes said debris to move through said contamination control arrangement from said second chamber to said first chamber; and said valve seat positioned between said supply port and said control chamber for controlling the flow of fluid between said supply port and said control chamber in response to the movement of said valving member in relation to said valve seat wherein said contamination control arrangement removed debris from an annulus between said valve shaft and said land by pressurized fluid from said second chamber migrating through said contamination control arrangement to said first chamber.

8. The valve of claim 7, wherein said contamination control arrangement is one selected from a group comprising a helical groove, a knurled portion, a double helical surface an etched surface, a textured surface, one or more grooves, all formed on said valve shaft or said land or combinations thereof.

9. The valve of claim 7 wherein said contamination control arrangement further provides hydraulic centering of said valve shaft during operation so that said valve shaft is centered in said land.

10. The valve of claim 7 wherein said valve member is a spool having one or more valve portions.

11. The valve of claim 7 wherein said valve is one selected from the group comprising a transmission valve, agricultural valve, medical valve or hydraulic control valve, a transmission, clutch, differential, turbo shift mechanism, transfer case, brake system, power steering system, or an all-wheel drive coupling.

12. A valve having an contamination control arrangement, comprising:
a valve housing;
a land, where said land is positioned in said valve housing;
a valve member having a valve shaft slidably disposed through said land, and a valving portion;
a supply port for supplying fluid to said valve member;
a control chamber controlled by said valve member;
a valve seat operably associated with said valving portion of said valve member positioned between said supply port and said control chamber; and,
a contamination control arrangement positioned between said land and said valve shaft, wherein said contamination control arrangement removes debris from the annulus between said valve shaft and said land as said valve shaft slides through said land and subsequent movements of said valve shaft through said shoulder causes said debris to move through said contamination control arrangement from said second chamber to said first chamber wherein said contamination control arrangement removes any contaminate present on said valve shaft or in an annulus between said valve shaft and said land when high pressure fluid from said second chamber migrates through said contamination control arrangement to said first chamber.

13. The valve of claim 12 wherein said contamination control arrangement is one selected from a group comprising a helical groove, a knurled portion, a double helical surface, an etched surface, a textured surface, one or more grooves, wherein said contamination control arrangement are all formed on said valve shaft or said land or combinations thereof.

14. The valve of claim 12 wherein said contamination control arrangement is further provides hydraulic centering of said valve shaft during operation so that said valve shaft is centered in said land.

15. The valve of claim 12 wherein said valve member is a spool having one or more valve portions.

16. The valve of claim 12 wherein said valve is one selected from the group comprising a transmission valve, agricultural valve, medical valve or hydraulic control valve, a transmission, clutch, differential, turbo shift mechanism, transfer case, brake system, power steering system, or an all-wheel drive coupling.

* * * * *

UNITED STATES PATENT AND TRADEMARK OFFICE
CERTIFICATE OF CORRECTION

| | | |
|---|---|---|
| PATENT NO. | : 7,891,372 B2 | Page 1 of 1 |
| APPLICATION NO. | : 11/795166 | |
| DATED | : February 22, 2011 | |
| INVENTOR(S) | : Brian Stefina | |

It is certified that error appears in the above-identified patent and that said Letters Patent is hereby corrected as shown below:

In the Specifications:

Column 1,
Line 36, delete ","

Column 1
Line 42, "aniiulus" should be --annulus--

Column 2
Line 17, "vale" should be --valve--

Signed and Sealed this
Nineteenth Day of April, 2011

David J. Kappos
*Director of the United States Patent and Trademark Office*